United States Patent
Sasahara

(10) Patent No.: US 10,981,466 B2
(45) Date of Patent: Apr. 20, 2021

(54) ELECTRIC POWER DISTRIBUTION SYSTEM

(71) Applicant: Yazaki Corporation, Tokyo (JP)

(72) Inventor: Masato Sasahara, Susono (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 16/740,620

(22) Filed: Jan. 13, 2020

(65) Prior Publication Data

US 2020/0262308 A1 Aug. 20, 2020

(30) Foreign Application Priority Data

Feb. 18, 2019 (JP) .............................. JP2019-026304

(51) Int. Cl.
*B60L 58/10* (2019.01)
*B60L 53/22* (2019.01)
*B60L 50/64* (2019.01)
*H02J 7/00* (2006.01)

(52) U.S. Cl.
CPC .............. *B60L 58/10* (2019.02); *B60L 50/64* (2019.02); *B60L 53/22* (2019.02); *H02J 7/0063* (2013.01); *B60L 2210/10* (2013.01)

(58) Field of Classification Search
None
See application file for complete search history.

(56) References Cited

U.S. PATENT DOCUMENTS

| | | | |
|---|---|---|---|
| 2017/0022916 A1* | 1/2017 | Hirai | .......................... F01N 9/00 |
| 2019/0107406 A1* | 4/2019 | Cox | ................... G01C 21/3679 |
| 2019/0256018 A1* | 8/2019 | Taoka | ..................... B60L 50/66 |
| 2019/0301377 A1 | 10/2019 | Shibata | |

FOREIGN PATENT DOCUMENTS

JP  2017-221086 A  12/2017

* cited by examiner

*Primary Examiner* — Jared Fureman
*Assistant Examiner* — Joel Barnett
(74) *Attorney, Agent, or Firm* — Banner & Witcoff, Ltd.

(57) ABSTRACT

An electric power distribution system includes a first path through which electric power is supplied from a DC/DC converter to a driven load to be driven in a load group; a second path connected in parallel with the first path and through which electric power is supplied from the battery to the driven load; a third path connected in series with the second path and connecting the DC/DC converter and the battery; a first switching circuit provided in the third path and switched to either ON state or OFF state; and a control unit switching the first switching circuit to either the ON state or the OFF state based on travel route information of a navigation system. The control unit switches the first switching circuit to the ON state according to a peak current of a load current of the driven load derived from the travel route information.

3 Claims, 6 Drawing Sheets

FIG. 5

| TRAVEL AREA | AREA DIVISION | PEAK CURRENT | FIRST SWITCHING CIRCUIT | SECOND SWITCHING CIRCUIT |
|---|---|---|---|---|
| X(0) | RECTILINEAR AREA X_1(i) | 60(A) | ON | OFF |
| X(1) | INTERSECTION AREA X_2(j) | 102(A) | ON | ON |
| X(2) | RECTILINEAR AREA X_1(i+1) | 60(A) | ON | OFF |
| X(3) | INTERSECTION AREA X_2(j+1) | 105(A) | ON | ON |
| X(4) | RECTILINEAR AREA X_1(i+2) | 70(A) | ON | OFF |
| X(5) | INTERSECTION AREA X_2(j+2) | ... | ON | ON |
| ... | ... | ... | ... | ... |
| X(10) | PARKING AREA X_0 | 150(A) | ON | ON |

ELECTRIC POWER DISTRIBUTION SYSTEM

CROSS-REFERENCE TO RELATED APPLICATIONS

This application is based on and claims priority under 35 USC 119 from Japanese Patent Application No. 2019-026304 filed on Feb. 18, 2019, the contents of which are incorporated herein by reference.

TECHNICAL FIELD

The present disclosure relates to an electric power distribution system.

BACKGROUND ART

In the related art, an electric power distribution system that supplies electric power from at least one of a DC/DC converter and a battery is mounted on a vehicle such as a hybrid vehicle or an electric vehicle (EV). The electric power distribution system includes a first path and a second path

CITATION LIST

Patent Literature

Patent Literature 1: JP-A-2017-221086

SUMMARY OF INVENTION

In general, when an output current of the DC/DC converter exceeds a rated current of the DC/DC converter, output efficiency decreases due to magnetic saturation of a coil included in the DC/DC converter, and an output voltage of the DC/DC converter decreases. Therefore, in the related art as described in Patent Literature 1, for example, a 12V battery is mounted in parallel with the DC/DC converter, and the DC/DC converter and the battery are always connected. Due to such a circuit configuration, charge and discharge of the battery is controlled by the output voltage of the DC/DC converter. Therefore, since the battery is maintained in a fully charged state, deterioration of the battery is prevented if the battery is formed of a lead storage battery, but deterioration of the battery is promoted if the battery is formed of a lithium ion battery. Therefore, in a case that the battery is formed of a lithium ion battery, the output voltage of the battery is controlled so as to not become in the fully charged state.

However, since there is a difference between the output voltage of the DC/DC converter and the output voltage of the battery, micro charge and discharge are performed on the battery. Such repetition of the micro charge and discharge is concerned as a factor that deteriorates the battery that is not preferable to maintain a fully charged state, such as a lithium ion battery.

The present disclosure has been made in view of such a situation, and is capable of preventing deterioration of the battery.

An electric power distribution system according to one aspect of the present disclosure is mounted in a vehicle and supplies electric power from at least one of a DC/DC converter and a battery. The electric power distribution system includes: a first path through which electric power is supplied from the DC/DC converter to a driven load to be driven in a load group; a second path that is connected in parallel with the first path and through which electric power is supplied from the battery to the driven load; a third path that is connected in series with the second path and connects the DC/DC converter and the battery; a first switching circuit that is provided in the third path and can be switched to any one of an ON state and an OFF state; and a control unit that switches the first switching circuit to any one of the ON state and the OFF state based on travel route information of a navigation system mounted on the vehicle. The control unit switches the first switching circuit to the ON state according to a peak current of a load current of the driven load derived based on the travel route information.

In the electric power distribution system according to one aspect of the present disclosure, a peak current is generated in a time zone in which an output current of the DC/DC converter exceeds a rated current of the DC/DC converter, and the control unit preferably maintains the ON state of the first switching circuit in the time zone.

In the electric power distribution system according to one aspect of the present disclosure, the control unit derives the peak current for each travel area analyzed based on the travel route information, and each of the travel areas is predicted to be passed by the vehicle during traveling and is preferably one of rectilinear area and an intersection area.

According to one aspect of the present disclosure, deterioration of the battery can be prevented.

BRIEF DESCRIPTION OF DRAWINGS

FIG. 5 is a diagram showing an example of a switching schedule of the first switching circuit and the second switching circuit according to the embodiment to which the present disclosure is applied.

DESCRIPTION OF EMBODIMENTS

Hereinafter, an embodiment of the present disclosure will be described with reference to the drawings, but the present disclosure is not limited to the following embodiment.
(Circuit Configuration)

Figure 1:
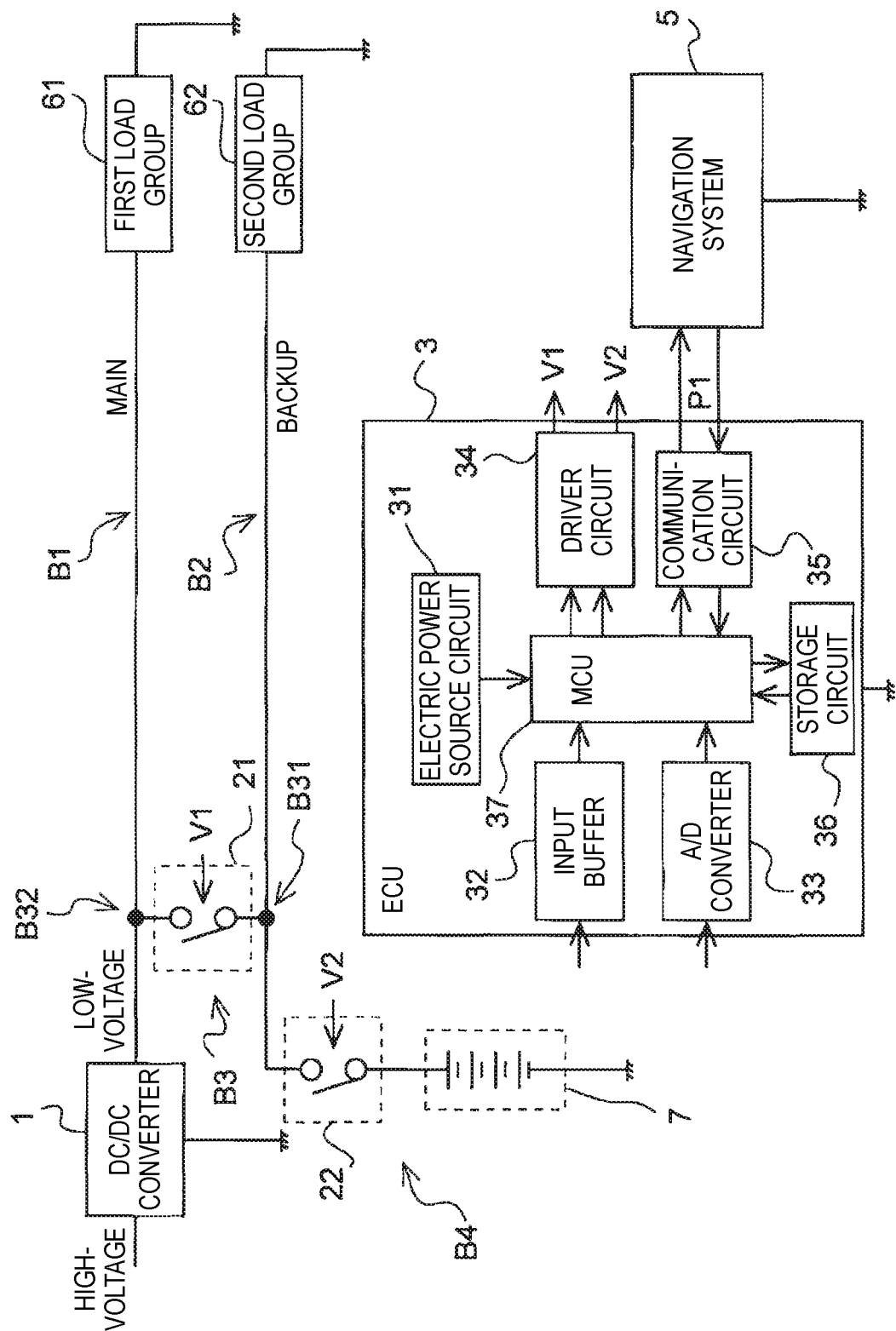
FIG. 1 is a block circuit diagram of an electric power distribution system according to an embodiment to which the present disclosure is applied.

FIG. 1 is a block circuit diagram of an electric power distribution system according to an embodiment to which the present disclosure is applied. The electric power distribution system shown in FIG. 1 is mounted on a vehicle (not shown) and supplies electric power from at least one of a DC/DC converter 1 and a battery 7. The vehicle (not shown) is, for example, an electric vehicle, a plug-in hybrid vehicle (PHEV), a hybrid electric vehicle (HEV) or the like.

Electric power supply destinations are a first load group 61 and a second load group 62. The first load group 61 includes, for example, a typical load assumed in the related art and a load associated with automatic driving. The second load group 62 is a load minimally required for the automatic driving. The typical load is, for example, an electric power steering device, a light, a wiper or the like. In the automatic driving, for example, at a level 3 (LV3) as an automation level specified by the Japanese government or the National Highway Traffic Safety Administration (NHTSA) of the United States, a system controls all acceleration, steering and braking of a vehicle. Therefore, the load associated with the automatic driving corresponds to a load for controlling acceleration, steering and braking of the vehicle, specifically, an electric power steering device, a global positioning system (GPS), various radar devices, an imaging device, various ECUs and the like. That is, the electric power supply destination is a driven load to be driven in a load group 6.

The first load group 61 and the second load group 62 may include a load capable of continuing minimum automatic driving. For example, assuming a level 2 (LV2) as an automation level, the system is required to automatically perform a plurality of operations among acceleration, steering and braking of the vehicle, so that the load capable of continuing the minimum automatic driving is configured to realize the above operations. Therefore, the load capable of continuing the minimum automatic driving includes a load for automatically performing, by a system, a plurality of operations among acceleration, steering and braking of the vehicle, specifically, a part of a configuration for realizing the level 3 (LV3) as the automation level. When any one of the first load group 61 and the second load group 62 is not particularly limited, it is referred to as the load group 6.

The DC/DC converter 1 includes a switching circuit (not shown) and the like, and converts a high-voltage output voltage output from a motor or a generator that generates electricity by rotation of an engine into a low-voltage output voltage. Therefore, the DC/DC converter 1 can output the low-voltage output voltage to the first load group 61 and the second load group 62. On the other hand, the battery 7 is formed of a secondary battery. Specifically, the secondary battery is a lithium ion battery, and supplies a dark current to the first load group 61 and the second load group 62. In addition, the battery 7 functions as an auxiliary electric power source of the DC/DC converter 1, and also functions as a backup electric power source for supplying electric power to the first load group 61 and the second load group 62 when the DC/DC converter 1 is abnormal. If electric power is supplied to any one of load groups 6, the automatic driving can be continued.

As shown in FIG. 1, the electric power distribution system includes a first path B1, a second path B2, a third path B3 and a fourth path B4. The first path B1 is a main electric power supply path through which electric power is supplied from the DC/DC converter 1 to a driven load to be driven in the first load group 61. The second path B2 is connected in parallel with the first path B1, and is a backup electric power supply path through which electric power is supplied from any one of the DC/DC converter 1 and the battery 7 to a driven load to be driven in the second load group 62. The third path B3 is provided between a connection point B31 of the second path B2 and a connection point B32 of the first path B1. The third path B3 is connected in series with the second path B2, and is an electric power supply path that connects the DC/DC converter 1 and the second load group 62. The fourth path B4 is an electric power supply path that connects the battery 7 and the second load group 62 via a connection point B31.

The electric power distribution system further includes a first switching circuit 21, a second switching circuit 22 and an ECU3. The first switching circuit 21 is a circuit that is provided in the third path B3 and can be switched to any one of an ON state and an OFF state. The second switching circuit 22 is a circuit that is provided in the fourth path B4 and can be switched to any one of an ON state and an OFF state. When the first path B1 and the second path B2 are normal, the first switching circuit 21 is controlled to be in the ON state, and the second switching circuit 22 is controlled to be in the OFF state. With such a circuit configuration, the first load group 61 and the second load group 62 are supplied with electric power from the DC/DC converter 1.

When an abnormality occurs in the first path B1, the first switching circuit 21 is controlled to be in the OFF state, and the second switching circuit 22 is controlled to be in the ON state. With such a circuit configuration, electric power is not supplied to the first load group 61, but is supplied to the second load group 62, so that the automatic driving is continued. In addition, when a voltage supplied to the first load group 61 and the second load group 62 is predicted to decrease merely by electric power supplied from the DC/DC converter 1, the second switching circuit 22 is controlled to be in the ON state. With such a circuit configuration, since electric power of the battery 7 is also supplied to the first load group 61 and the second load group 62, the voltage supplied to the first load group 61 and the second load group 62 is prevented from decreasing.

The first switching circuit 21 and the second switching circuit 22 include, for example, a mechanical relay that switches to any one of the ON state and the OFF state by a mechanical movement using a movable contact. The first switching circuit 21 and the second switching circuit 22 may include a semiconductor relay that switches to any one of the ON state and the OFF state by an electronic circuit including a semiconductor switching element or the like.

The ECU3 includes an electric power source circuit 31, an input buffer 32, an A/D converter 33, a driver circuit 34, a communication circuit 35, a storage circuit 36 and an MCU37, and functions as a control unit. The electric power source circuit 31 steps down an input voltage to a voltage of the ECU3 within an action range. The input buffer 32 includes a latch circuit that latches a digital signal. The A/D converter 33 converts an analog signal into a digital signal and outputs the digital signal to the MCU37. As will be described in detail below, the MCU37 controls the driver circuit 34 to switch each of the first switching circuit 21 and the second switching circuit 22 to any one of the ON state and the OFF state based on a signal P1 including travel route information of a navigation system 5 mounted on the vehicle (not shown) as described above. The driver circuit 34 includes a gate driver, and outputs a voltage V1 that drives the first switching circuit 21 and a voltage V2 that drives the second switching circuit 22. The communication circuit 35 receives the signal P1 including the travel route information from the navigation system 5. The storage circuit 36 includes, for example, an electrically erasable programmable read-only memory (EEPROM (registered trademark)).

Figure 2:
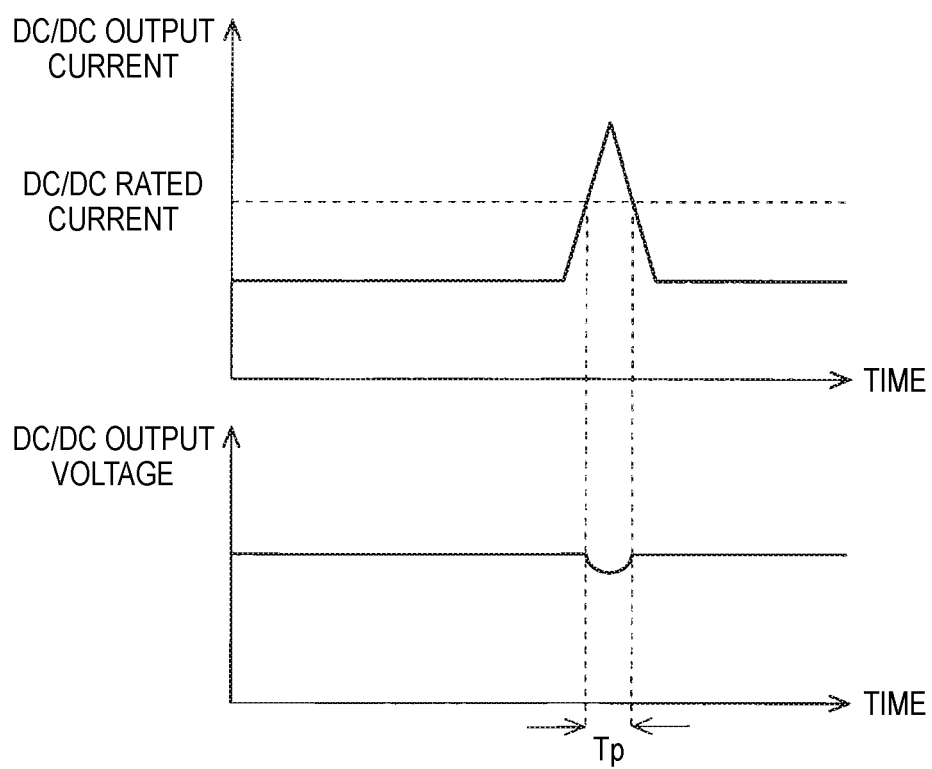
FIG. 2 is a diagram showing an example of output characteristics of an output current and an output voltage of a DC/DC converter according to the embodiment to which the present disclosure is applied.

FIG. 2 is a diagram showing an example of output characteristics of an output current and an output voltage of the DC/DC converter 1 according to the embodiment to which the present disclosure is applied. As shown in FIG. 2, when the output current of the DC/DC converter 1 exceeds a rated current of the DC/DC converter 1, output efficiency decreases due to magnetic saturation of a coil included in the DC/DC converter 1, so that the output voltage of the DC/DC converter 1 decreases. Therefore, by compensating for the decrease in the output voltage of the DC/DC converter 1 with the battery 7, the ECU3 performs control in which an applied voltage applied to a driven load to be driven in loads included in each of the first load group 61 and the second load group 62 is held at a constant level. Specifically, the ECU3 switches the first switching circuit 21 to the OFF state and switches the second switching circuit 22 to the ON state according to a peak current of a load current of the driven load derived based on the travel route information. As shown in FIG. 2, the peak current is generated in a time zone Tp in which the output current of the DC/DC converter 1 exceeds the rated current of the DC/DC converter 1. Therefore, the ECU3 maintains the OFF state of the first switching circuit 21 and the ON state of the second switching circuit 22 in the time zone Tp.

Figure 3:
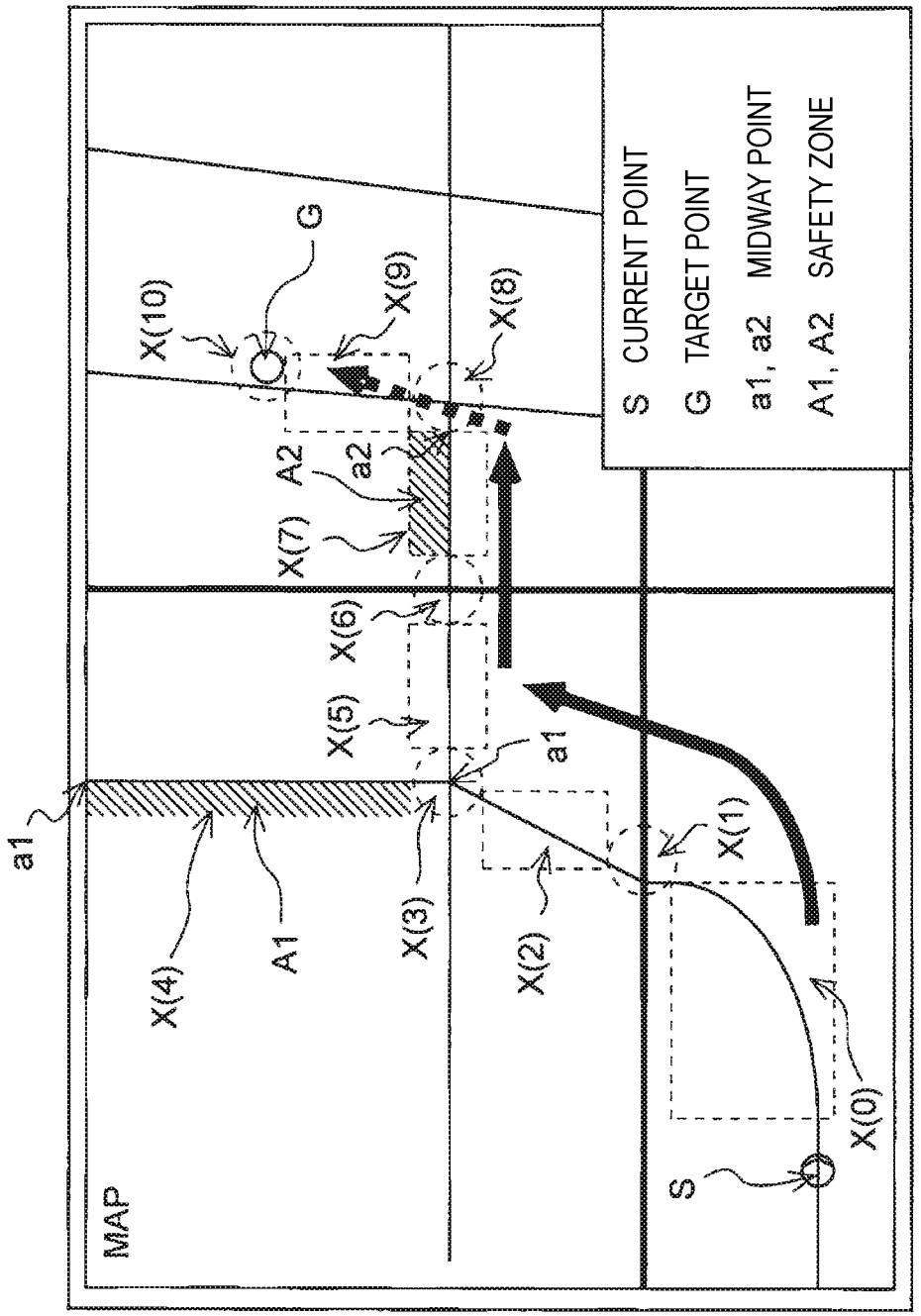
FIG. 3 is a diagram showing an example of a travel route and travel areas X(0) to X(10) of a navigation system according to the embodiment to which the present disclosure is applied.

Next, the travel route information will be described in detail with reference to FIG. 3. FIG. 3 is a diagram showing an example of a travel route and travel areas X(0) to X(10) of the navigation system 5 according to the embodiment to which the present disclosure is applied. When a person drives the vehicle (not shown) as in the related art, it is difficult for the ECU3 to predict when and what kind of load is to be driven, so that it is required to always assist the DC/DC converter 1 with the battery 7. However, in the automatic driving as described above, since the system drives the vehicle (not shown), the ECU3 can predict when and what kind of load is to be driven. That is, the ECU3 can predict a driven load to be driven. Therefore, the ECU3 uses the travel route information of the navigation system 5 in order to realize prediction of the driven load. For example, as shown in FIG. 3, the travel route information includes stoppable areas such as a safety zone A1 and a safety zone A2 as well as road information on the travel route. The road information includes, for example, two lanes on one side, one lane on one side and road width.

Specifically, the ECU3 divides a region on a map through which the vehicle (not shown) passes based on the travel route information into the travel areas X(0) to X(10). Each of the travel areas X(0) to X(10) is predicted to be passed by the vehicle (not shown) during traveling, and is any one of a rectilinear area X_1 and an intersection area X_2. The rectilinear area X_1 is further finely classified based on the road information. For example, two lanes on one side and one lane on one side are different rectilinear areas X_1. For example, in the example in FIG. 3, the travel area X(0) and the travel area X(2) have different road widths, but are both rectilinear areas X_1. In the example in FIG. 3, the travel areas X(0), X(2), X(4), X(5), X(7) and X(9) correspond to rectilinear areas X_1. Among the travel areas X(0), X(2), X(4), X(5), X(7) and X(9), the travel area X(4) is allocated to the safe zone A1 and the travel area X(7) is allocated to the safe zone A2. The travel areas X(1), X(3), X(6), X(8) and X(10) correspond to intersection areas X_2.

The travel area X(4) is allocated to the safety zone A1, whereby when an abnormality occurs in electric power sources such as the first battery 7_1 and the second battery 7_2 while the vehicle (not shown) is moving from the travel areas X(0) to X(3), the vehicle (not shown) is safely moved to the travel area X(4), that is, to the safe zone A1, and is stopped. Therefore, since the vehicle (not shown) travels until reaching the safe zone A1, backup required electric power Pal including an amount for travelling to the safe zone A1 can be derived by allocating the travel area X(4) to the safe zone A1, as will be described below. The same applies to the travel area X(7). Each of the travel areas X(0) to X(10) is referred to as a travel area X unless particularly limited.

The ECU3 derives the peak current of the load current of the driven load in the loads included in each of the first load group 61 and the second load group 62 for each travel area X divided as described above. The ECU3 switches the switching circuit 2 to the ON state according to the derived peak current. That is, by predicting the peak current of the load current of the driven load based on the travel route information acquired from the navigation system 5, the ECU3 can maintain the battery 7 in an open state when the vehicle (not shown) is traveling other than in the time zone Tp as shown in FIG. 2. For example, as shown in FIG. 3, when the vehicle (not shown) is automatically driven from a current point S to a target point G via midway points a1 and a2, the ECU3 controls the switching circuit 2 in the ON state only in the time period Tp as shown in FIG. 2.

Figure 4:
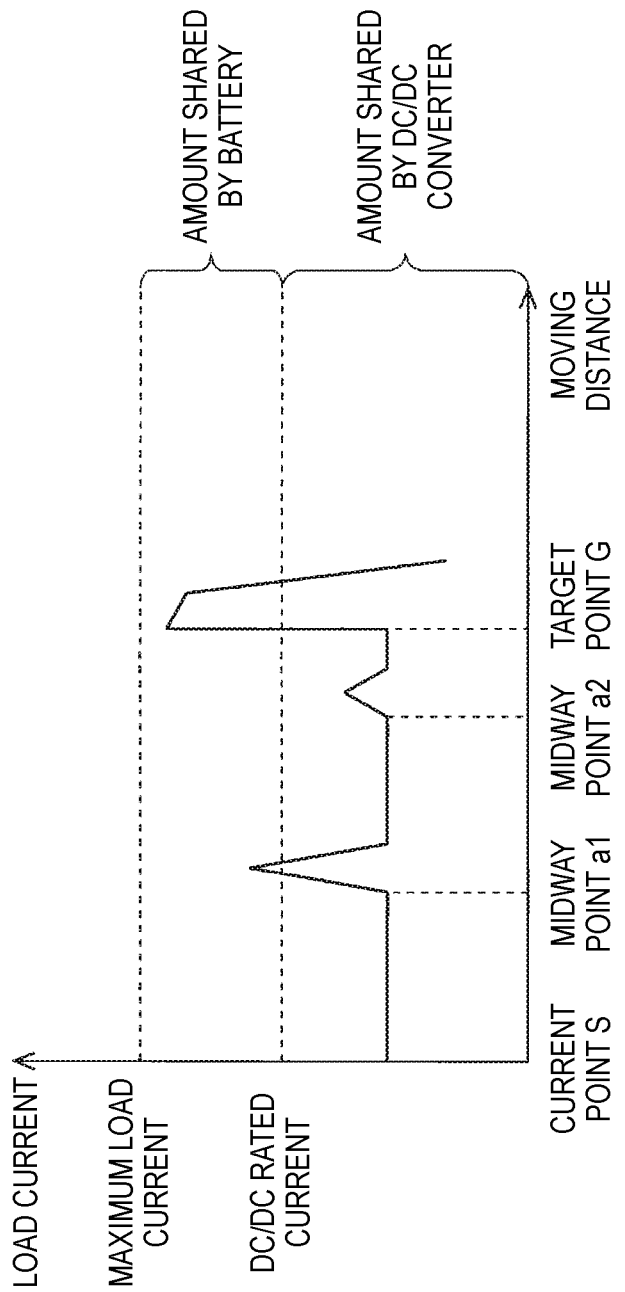
FIG. 4 is a diagram showing an example of a prediction map of a peak current of the load current of the driven load according to the embodiment to which the present disclosure is applied.

Next, processing for controlling the switching circuit 2 based on the prediction of the peak current of the load current of the driven load will be described with reference to FIG. 4. FIG. 4 is a diagram showing an example of a prediction map of the peak current of the load current of the driven load according to the embodiment to which the present disclosure is applied. FIG. 5 is a diagram showing an example of a switching schedule of the first switching circuit 21 and the second switching circuit 22 according to the embodiment to which the present disclosure is applied. First, as described above, the ECU3 specifies a location where the peak current of the load current of the driven load is generated for each travel area X executed based on the travel route information. For example, a place on the travel route where the vehicle (not shown) turns right at an intersection or is parked is the location where the peak current of the load current of the driven load is generated. After specifying the location where the peak current of the load current of the driven load is generated, the ECU3 calculates the peak current. The peak current is calculated from a steering angle of an electric power steering device, an operation amount of a brake, a driving time of various sensors and cameras, and the like. FIG. 4 shows the peak current of the load current of the driven load in which the calculated results are integrated and a current load current is taken into consideration. Specifically, as shown in FIG. 4, when the output current of the DC/DC converter 1 is assumed to exceed the rated current of the DC/DC converter 1, the battery 7 is allowed to compensate for the decrease in the output voltage of the DC/DC converter 1 in order to supply the peak current of the load current of the driven load.

Specifically, as shown in FIG. 5, the ECU3 controls the first switching circuit 21 in the ON state, and controls the second switching circuit 22 to any one of the ON state and the OFF state according to a magnitude of the peak current of the load current of the driven load for each travel area X. For example, in rectilinear areas X_1(i) to X_1(i+2), the second switching circuit 22 is controlled to be in the OFF state. On the other hand, in intersection areas X_2(j) to X_2(j+2) and a parking area X_0, the second switching circuit 22 is controlled to be in the ON state. That is, when the peak current of the load current of the driven load exceeds the rated current of the DC/DC converter 1, the output efficiency decreases due to magnetic saturation of the coil included in the DC/DC converter 1, and the output voltage of the DC/DC converter 1 decreases, so that the ECU3 controls the second switching circuit 22 in the ON state in addition to the first switching circuit 21, thereby controlling electric power supply from both the DC/DC converter 1 and the battery 7 to be possible. Therefore, as described above, the voltage supplied to the first load 61 and the second load 62 is prevented from decreasing. On the other hand, when the peak current of the load current of the driven load does not exceed the rated current of the DC/DC converter 1, the output voltage of the DC/DC converter 1 does not decrease, so that the ECU3 controls the second switching circuit 22 in the OFF state while controlling the first switching circuit 21 in the OFF state, thereby controlling electric power supply from the DC/DC converter 1 to be possible. When any one of the rectilinear areas X_1(i) to X_1(i+2) is not particularly limited, it is referred to as a rectilinear area X_1. When any one of the intersection areas X_2(j) to X_2(j+2) is not particularly limited, it is referred to as an intersection area X_2.

(Action)

Figure 6:
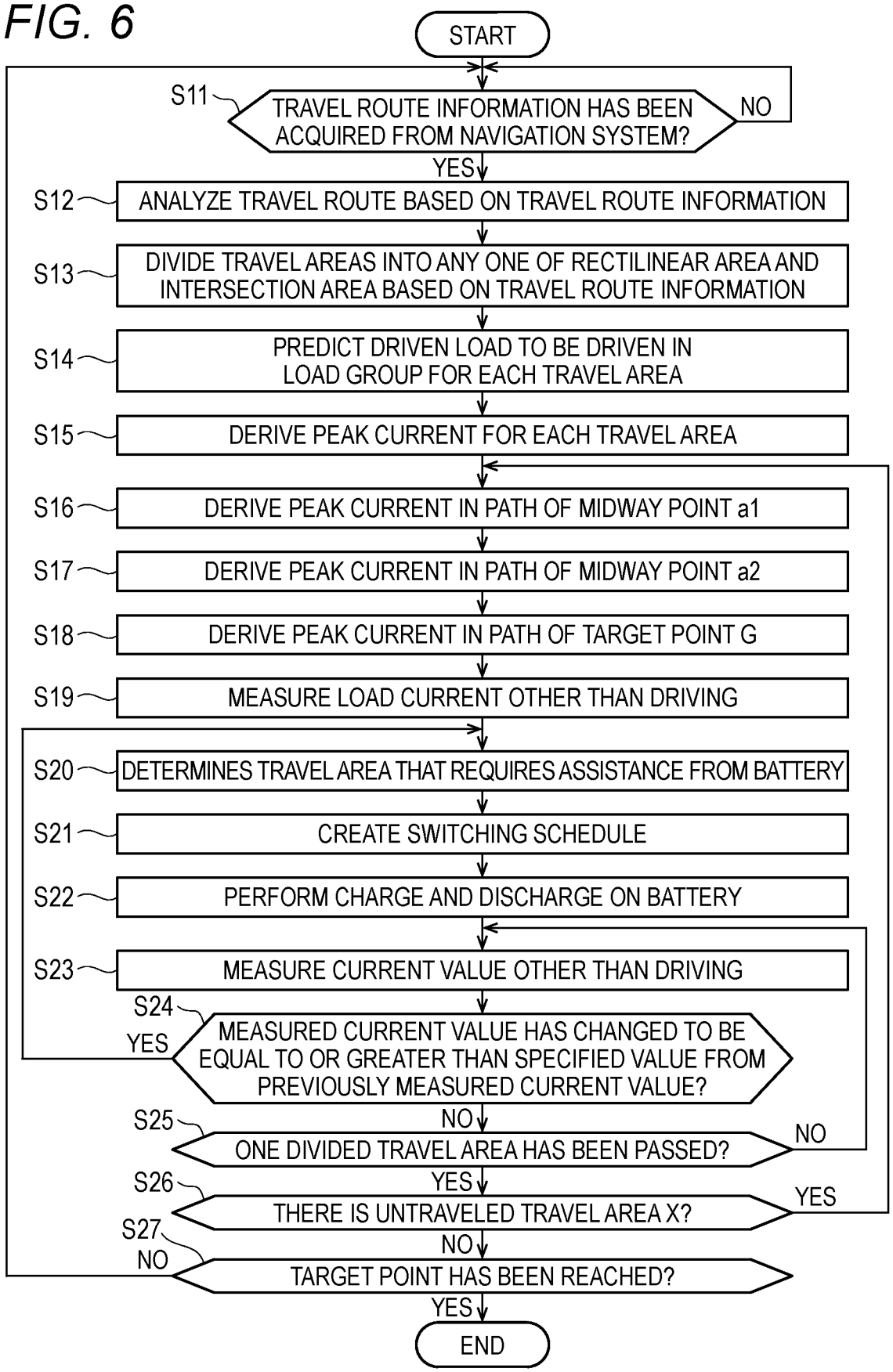
FIG. 6 is a flowchart showing a control example of the electric power distribution system according to the embodiment to which the present disclosure is applied.

Next, a specific control example will be described with reference to FIG. 6. Also, a peak current explained in step S15 to S18 is a peak current of the load current of the driven load. FIG. 6 is a flowchart showing a control example of the electric power distribution system according to the embodiment to which the present disclosure is applied. In step S11, the ECU3 determines whether the travel route information has been acquired from the navigation system 5. When the ECU3 determines that the travel route information has been acquired from the navigation system 5 (step S11; Y), processing proceeds to step S12. When the ECU3 determines that the travel route information has not been acquired from the navigation system 5 (step S11; N), the processing of step S11 is repeated.

In step S12, the ECU3 analyzes the travel route based on the travel route information, and the processing proceeds to step S13. In step S13, the ECU3 divides the travel areas X into any one of the rectilinear area X_1 and the intersection area X_2 based on the travel route information, and the processing proceeds to step S14. The travel area X(4) is a rectilinear area X_1 and corresponds to the safe zone A1. The travel area X(7) is a rectilinear area X_1 and corresponds to the safe zone A2. In step S14, the ECU3 predicts the driven load to be driven in the backup load 6_2 for each travel area X, and the processing proceeds to step S15. In step S15, the ECU3 derives the electric power used for the peak current for each travel area X, and the processing proceeds to step S16.

In step S16, the ECU3 derives a peak current in a path of the midway point a1, and the processing proceeds to step S17. In step S17, the ECU3 derives a peak current in a path of the midway point a2, and the processing proceeds to step S18. In step S18, the ECU3 derives a peak current in a path of the target point G, and the processing proceeds to step S19. In step S19, the ECU3 measures a load current other than driving, and the processing proceeds to step S20. In order to predict voltage decrease, it is required to obtain a current value including a load current required for driving and a load current other than driving, such as an air conditioner or an audio. Therefore, after the ECU3 obtains all current values consumed by the vehicle, the processing proceeds to step S20. In step S20, the ECU3 determines a travel area X that requires assistance from the battery 7, and the processing proceeds to step S21. In step S21, the ECU3 creates a switching schedule, and the processing proceeds to step S22. In step S22, the ECU3 performs charge and discharge on the battery 7, and the processing proceeds to step S23.

In step S23, the ECU3 measures a current value other than driving, and the processing proceeds to step S24. In step S24, the ECU3 determines whether the measured current value has changed to be equal to or greater than a specified value from the previously measured current value. When the ECU3 determines that the measured current value has changed to be equal to or greater than the specified value from the previously measured current value (step S24; Y), the processing returns to step S20. When the ECU3 determines that the measured current value has not changed to be equal to or greater than the specified value from the previously measured current value (step S24; N), the processing proceeds to step S25. In step S25, the ECU3 determines whether one of the divided travel areas X has been passed. When the ECU3 determines that one of the divided travel areas X has been passed (step S25; Y), the processing proceeds to step S26. When the ECU3 determines that one of the divided travel areas X has not been passed (step S25; N), the processing returns to step S23. The processing returns to step S23, whereby the ECU3 always monitors the current value other than driving, compares the previously measured current value with the currently measured current value by the processing of the next step S24. When the compared result shows a change of being equal to or greater than the specified value, the processing shifts to creating a switching schedule again by re-starting from step S20.

In step S26, the ECU3 determines whether there is an untraveled travel area X. When the ECU3 determines that there is an untraveled travel area X (step S26; Y), the processing returns to step S16. When the ECU3 determines that there is no untraveled travel area X (step S26; N), the processing proceeds to step S27. In step S27, the ECU3 determines whether the target point G has been reached. When the ECU3 determines that the target point G has been reached (step S27; Y), the processing ends. When the ECU3 determines that the target point G has not been reached (step S27; N), the processing returns to step S11.

EFFECTS

From the above description, in the present embodiment, the switching circuit 2 is controlled to be in the ON state according to the peak current of the load current of the driven load derived based on the travel route information. When the load current of the driven load is the peak current, the output current of the DC/DC converter 1 exceeds the rated current of the DC/DC converter 1, so that the output voltage of the DC/DC converter 1 decreases. Therefore, if the switching circuit 2 is controlled to be in the ON state according to the peak current of the load current of the driven load, the DC/DC converter 1 and the battery 7 are controlled to be in a conductive state only when the output voltage of the DC/DC converter 1 decreases, so that repetitive micro charge and discharge actions can be reduced. Therefore, deterioration of the battery 7 can be prevented.

In the present embodiment, the ON state of the switching circuit 2 is maintained in the time zone Tp in which the output current of the DC/DC converter 1 exceeds the rated current of the DC/DC converter 1. Therefore, if the output current of the DC/DC converter 1 does not exceed the rated current of the DC/DC converter 1, the DC/DC converter 1 and the battery 7 are in a non-conductive state, so that the battery 7 can be maintained in the open state as much as possible. Therefore, since the battery 7 can be efficiently used, deterioration of the battery 7 can be prevented particularly remarkably.

In the present embodiment, the peak current of the load current of the driven load is derived for each of the plurality of travel areas X analyzed based on the travel route information. As described above, each of the travel areas X is predicted to be passed by the vehicle during traveling, and is any one of the rectilinear area X_1 and the intersection area X_2. Therefore, the driven load corresponding to each of the travel areas X can be appropriately predicted. Therefore, since accuracy of deriving the peak current of the load current of the driven load can be improved, switching timing of the switching circuit 2 can be appropriately set.

Although the electric power distribution system to which the present disclosure is applied has been described above based on the embodiment, the present disclosure is not limited thereto, and modifications may be made without departing from the spirit of the present disclosure.

For example, in the present embodiment, the level 3 (LV3) and the level 2 (LV2) as automation levels have been described as the automatic driving, but the present invention is not limited thereto. For example, the load may be a load equal to or higher than a level 4 (LV4) as the automation level, or may be a load of the level 1 (LV1) as the automation level.

What is claimed is:

1. An electric power distribution system which is mounted in a vehicle and supplies electric power from at least one of a DC/DC converter and a battery, the electric power distribution system comprising:
   a first path through which electric power is supplied from the DC/DC converter to a driven load to be driven in a load group;
   a second path that is connected in parallel with the first path and through which electric power is supplied from the battery to the driven load;
   a third path that is connected in series with the second path and connects the DC/DC converter and the battery;
   a first switching circuit that is provided in the third path and is able to be switched to any one of an ON state and an OFF state; and
   a control unit that switches the first switching circuit to any one of the ON state and the OFF state based on travel route information of a navigation system mounted on the vehicle,
   wherein the control unit switches the first switching circuit to the ON state according to a peak current of a load current of the driven load derived based on the travel route information.

2. The electric power distribution system according to claim 1, wherein
   the peak current is generated in a time zone in which an output current of the DC/DC converter exceeds a rated current of the DC/DC converter, and
   the control unit maintains the ON state of the first switching circuit in the time zone.

3. The electric power distribution system according to claim 1, wherein
   the control unit derives the peak current for each travel area analyzed based on the travel route information, and
   each of the travel areas is predicted to be passed by vehicle during traveling and is one of a rectilinear area and an intersection area.

* * * * *